US007010617B2

(12) United States Patent
Kampe et al.

(10) Patent No.: US 7,010,617 B2
(45) Date of Patent: Mar. 7, 2006

(54) CLUSTER CONFIGURATION REPOSITORY

(75) Inventors: Mark A. Kampe, Los Angeles, CA (US); Frederic Herrmann, Palo Alto, CA (US); Gia-Khanh Nguyen, San Jose, CA (US); Frederic Barrat, Foster City, CA (US); Ramachandra Bethmangalkar, Santa Clara, CA (US); Ravi V. Chitloor, Santa Clara, CA (US)

(73) Assignee: Sun Microsystems, Inc., Pala Alto, CA (US)

( * ) Notice: Subject to any disclaimer, the term of this patent is extended or adjusted under 35 U.S.C. 154(b) by 834 days.

(21) Appl. No.: 09/846,250

(22) Filed: May 2, 2001

(65) Prior Publication Data

US 2001/0056461 A1 Dec. 27, 2001

Related U.S. Application Data

(60) Provisional application No. 60/201,209, filed on May 2, 2000, provisional application No. 60/201,099, filed on May 2, 2000.

(51) Int. Cl.
*G06F 15/16* (2006.01)

(52) U.S. Cl. ...................... 709/248; 709/201; 709/208; 709/213

(58) Field of Classification Search ................ 709/200, 709/201–203, 217, 208–213, 220–223, 248; 714/2, 4, 6, 14–16
See application file for complete search history.

(56) References Cited

U.S. PATENT DOCUMENTS 5,862,348 A * 1/1999 Pedersen .................... 709/229
6,151,688 A * 11/2000 Wipfel et al. ................. 714/48
6,324,654 B1 * 11/2001 Wahl et al. .................... 714/6
6,338,146 B1 * 1/2002 Johnson et al. ................ 714/4
6,401,120 B1 * 6/2002 Gamache et al. ........... 709/226
6,594,786 B1 * 7/2003 Connelly et al. ............. 714/50

OTHER PUBLICATIONS

XP-002188657—Ralph Droms et al, "DHCP Failover Protocol," Internet Draft, Internet Engineering Task Force, Network Working Group, The Internet Society, pp. 1-119, Mar. 2000.

XP-002941302—"Jini™ Architectural Overview, Technical White Paper," Sun Microsystems, pp. 1-21, Jan. 1999.

XP-002188658—Jim Plas, "Build a High-Availability Web Site with MSCS and IIS 4.0," Windows & .Net Magazine, pp. 1-3, Jun. 1999.

XP-004142121—A.W. van Halderen et al, "Hierarchical resource management in the Polder metacomputing Initiative," Parallel Computing 24, pp. 1807-1825, 1998.

XP-002149764—R. Droms, "Dynamic Host Configuration Protocol," Network Working Group. pp. 1-19, Mar. 1997.

* cited by examiner

*Primary Examiner*—Glenton B. Burgess
*Assistant Examiner*—Yasin Barqadle
(74) *Attorney, Agent, or Firm*—Kent A. Lembke; William J. Kubida; Hogan & Hartson LLP

(57) ABSTRACT

A system for providing real-time cluster configuration data within a clustered computer network including a plurality of clusters, including a primary node in each cluster wherein the primary node includes a primary repository manager, a secondary node in each cluster wherein the secondary node includes a secondary repository manager, and wherein the secondary repository manager cooperates with the primary repository manager to maintain information at the secondary node consistent with information maintained at the primary node.

13 Claims, 2 Drawing Sheets

CLUSTER CONFIGURATION REPOSITORY

CROSS-REFERENCE TO RELATED APPLICATIONS

This application claims the benefit of U.S. Provisional Patent Application No. 60/201,209 filed May 2, 2000, and entitled "Cluster Configuration Repository," and U.S. Provisional Application No. 60/201,099, filed May 2, 2000, and entitled "Carrier Grade High Availability Platform", which are hereby incorporated by reference.

BACKGROUND OF THE INVENTION

1. Field of the Invention

This invention relates to data management for a carrier-grade high availability platform, and more particularly, to a repository system and method for the maintenance of, and access to, cluster configuration data in real-time.

2. Discussion of the Related Art

High availability computer systems provide basic and real-time computing services. In order to provide highly available services, peers in the system must have access to, or be capable of having access to, configuration data in real-time.

Computer networks allow data and services to be distributed among computer systems. A clustered network provides a network with system services, applications and hardware divided into nodes that can join or leave a cluster as is necessary. A clustered high availability computer system must maintain cluster data in order to provide services in real-time. Generally this creates large overhead and commitment of system resources and the need for additional hardware to provide the high speed access necessary. The additional hardware and system complexity can ultimately slow system performance. System costs are also increased by the hardware and complex software additions.

SUMMARY OF THE INVENTION

The present invention is directed to a system for providing real-time cluster configuration data within a clustered computer network that substantially obviates one or more of the problems due to limitations and disadvantages of the related art. An object of the present invention is to provide an innovative system and method for providing real-time storage and retrieval of cluster configuration data and real-time recovery capabilities in the event a master node of a cluster, or its configuration data, is inaccessible due to failure or corruption.

It is therefore an object of the present invention to provide real-time access and retrieval of cluster configuration data.

It is also an object of the present invention to provide primary and secondary repositories and repository managers to eliminate down time from a single-point-of-failure.

A further object of the present invention is the ability for external management and configuration operations to be initiated merely by updating the information kept in the repository. For example, an application can register its interest in specific information kept in the repository and will then be automatically notified whenever any changes in that data occur.

Another object of the present invention is to allow the repository to be used by the high availability aware applications as a highly available, distributed, persistent storage facility for slow-changing application/device state information (such as calibration data, software version information, health history, and administrative states).

Additional features and advantages of the invention will be set forth in the description, which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the invention includes a system for providing real-time cluster configuration data within a clustered computer network includes a plurality of clusters, including a primary node in each cluster wherein said primary node includes a primary repository manager, a secondary node in each cluster wherein said secondary node includes a secondary repository manager, and wherein said secondary repository manager cooperates with said primary repository manager to maintain information at said secondary node consistent with information maintained at said primary node.

In another aspect, a method is presented for providing real-time cluster configuration data within a clustered computer network including a plurality of clusters, including the steps of choosing a primary node in each cluster wherein the primary node includes a primary repository manager, choosing a secondary node in each cluster wherein the secondary node includes a secondary repository manager, and causing the secondary repository manager to cooperate with the primary repository manager to maintain information at the secondary node consistent with information maintained at the primary node.

In another aspect, a computer program product is provided including a computer useable medium having computer readable code embodied therein for providing real-time cluster configuration data within a clustered computer network including a plurality of clusters, the computer program product adapted when run on a computer to effect steps including choosing a primary node in each cluster wherein the primary node includes a primary repository manager, choosing a secondary node in each cluster wherein the secondary node includes a secondary repository manager, and causing the secondary repository manager to cooperate with the primary repository manager to maintain information at the secondary node consistent with information maintained at the primary node.

In a further aspect, the invention provides a computer program product including a computer useable medium having computer readable code embodied therein for providing real-time cluster configuration data within a clustered computer network comprising a plurality of clusters, the computer program product including means for choosing a primary node in each cluster wherein the primary node includes a primary repository manager, means for choosing a secondary node in each cluster wherein the secondary node includes a secondary repository manager, and means for causing the secondary repository manager to cooperate with the primary repository manager to maintain information at the secondary node consistent with information maintained at the primary node.

Thus, in accordance with an aspect of the invention, a cluster configuration repository is a software component of a carrier-grade high availability platform. The repository provides the capability of storing and retrieving configuration data in real-time. The repository is a highly available service and it is distributed on a cluster. It also supports redundant persistent storage devices, such as disks or flash RAM. The repository further provides applications with a simple application programming interface (API). The primitives are essentially elementary record-oriented data management functions: creation, destruction, update and retrieval.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

The present invention, referred to in this embodiment as the cluster configuration repository, is a software component of a carrier-grade high availability platform. A main purpose is to provide real-time retrieval of configuration data from anywhere within the cluster. The cluster configuration repository is a fast, lightweight, and highly available persistent database that is distributed on the cluster and allows data in various forms such as structure, and table to be stored and retrieved. Using a carrier-grade high availability event service, the cluster configuration repository can also notify applications whenever repository data is modified. In addition, it can support redundant persistent storage devices, such as disks or flash RAM.

The cluster configuration repository also provides applications within the cluster a simple API. The primitives are essentially elementary record-oriented data management functions such as creation, destruction, update and retrieval. In order to satisfy the performance requirements for some time-critical cluster configuration repository services, the cluster configuration repository offers two types of APIs: a common base API, and a real-time API. The common base API set includes a set of primitives that are not performance-critical. The real-time API, on the other hand, guarantees high performance for read operations of repository data.

The cluster configuration repository must be highly available within the carrier-grade high availability platform. To support such a requirement, the cluster configuration repository managers should be available in a primary/secondary mode to eliminate the possibility of the single-point-of-failure. This primary/secondary configuration allows a secondary instance of the repository to always be available to replace the master repository, should it ever fail.

A key role of the cluster configuration repository in the carrier-grade high availability platform is that many external management and configuration operations can be initiated merely by updating the information kept in the cluster configuration repository. An application can register its interest in specific information kept in the cluster configuration repository and will then be automatically notified whenever any changes in that data occurs. Following the notification, the application can take appropriate actions.

Aside from storing configuration data, the cluster configuration repository can also be used by the HA-aware applications as a highly available, distributed, persistent storage facility for slow-changing application/device state information (such as calibration data, software version information, health history, and administrative states).

Figure 1:
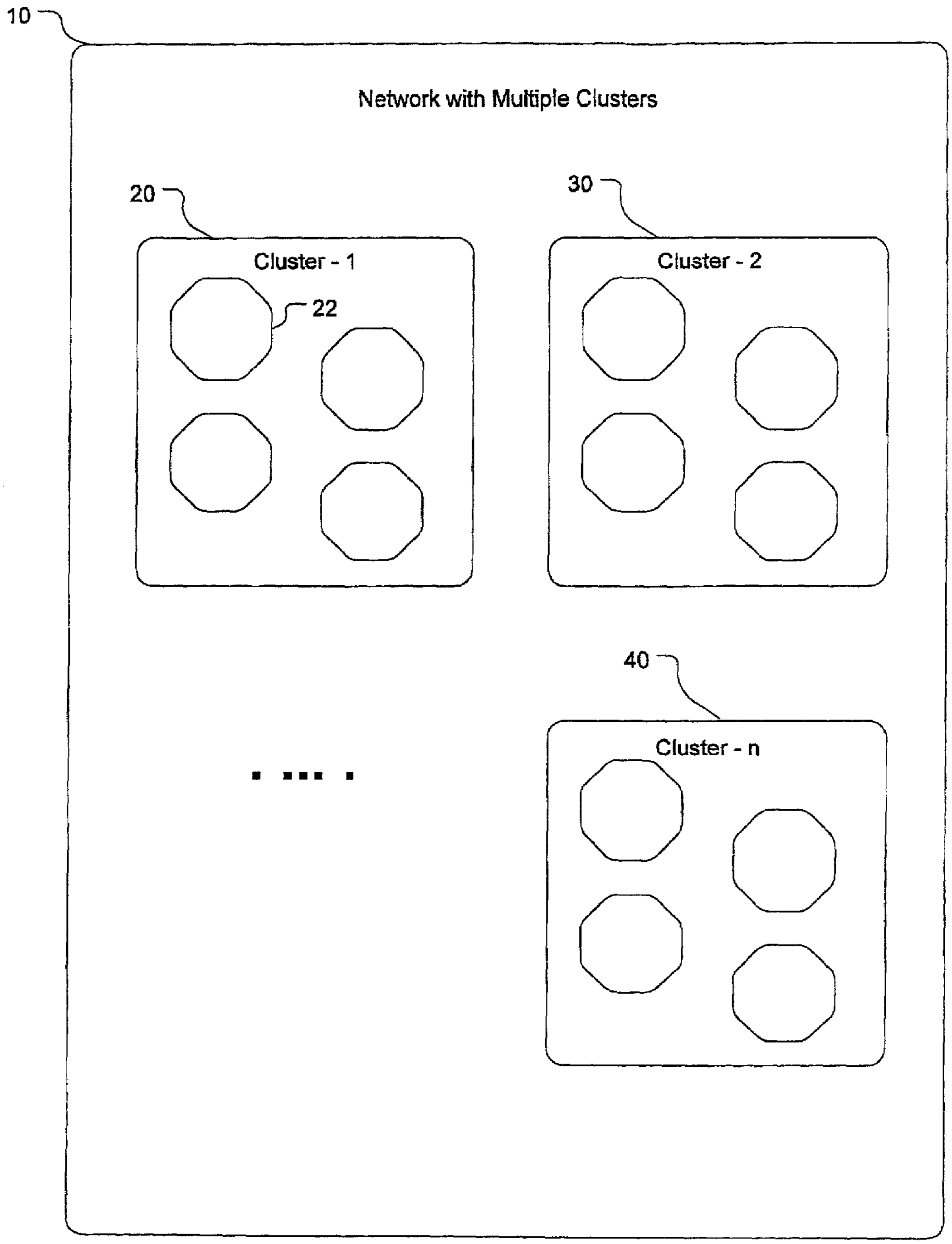
FIG. 1 is a diagram illustrating a clustered high availability network.

Referring to FIG. 1, a highly available network 10 is divided into clusters 20, 30 and 40. Each cluster 20, 30, and 40 are organizations of nodes 22. Nodes 22 are organized within each cluster to provide highly available software applications and access to hardware.

Figure 2:
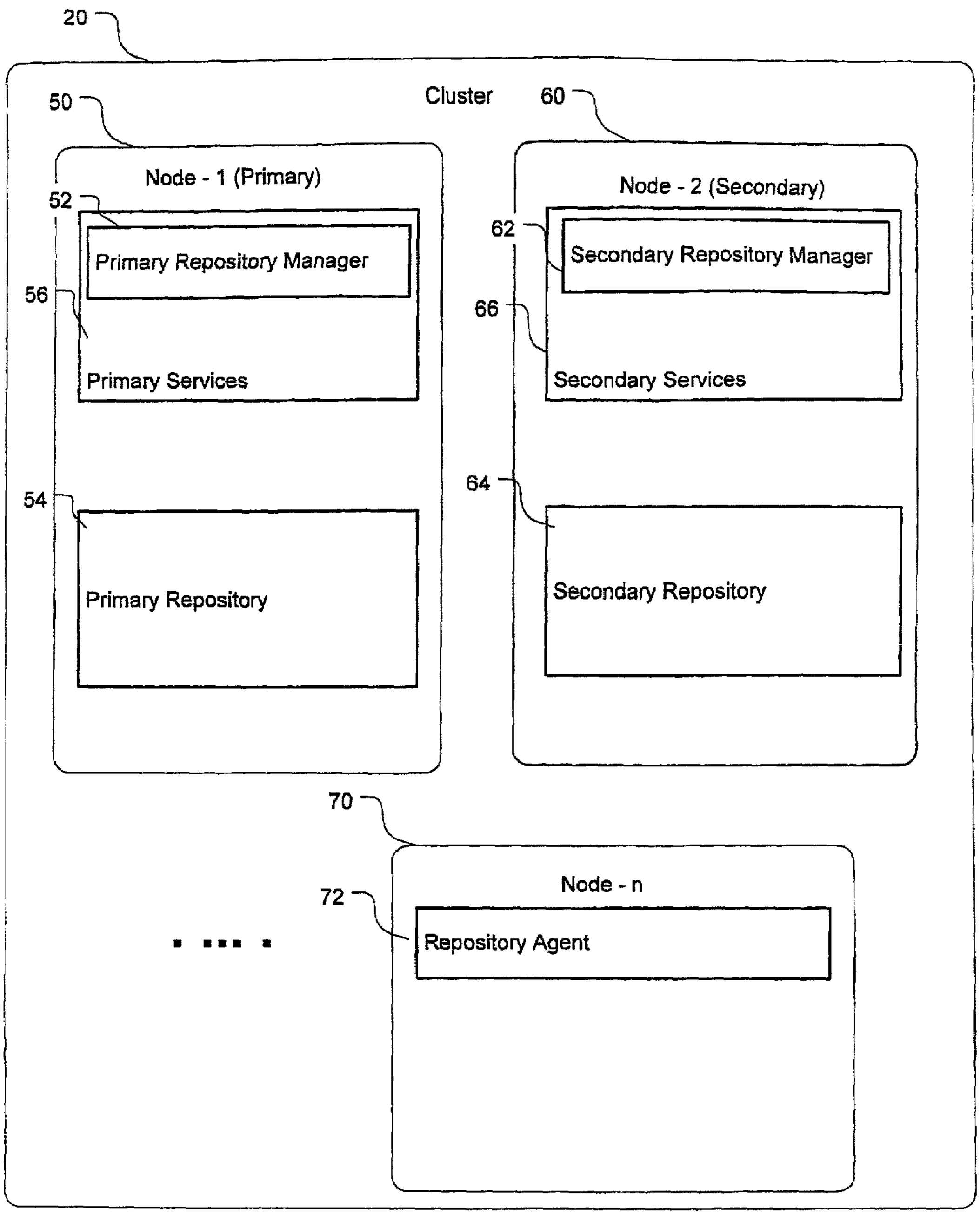
FIG. 2 is a diagram illustrating a single cluster with n-nodes, including a primary and secondary node.

Referring to FIG. 2, a cluster in the present invention is normally made up of at least a primary node 50 and a secondary node 60. Core cluster services are provided as primary services 56. A back-up copy is provided as secondary services 66. Within these copies of core cluster services the primary services 56 include the primary repository manager 52 and the secondary services 66 include the secondary repository manager 62. The primary services 56, including the primary repository manager 52, are generally located on the primary node 50. The primary repository manager 52 is responsible for: managing the persistent storage of the repository data on disk; maintaining an in-memory copy of the entire repository to guarantee high-performance for read operations; and synchronizing the repository updates.

The secondary repository manager 62, on the other hand, is generally located on the secondary node 60 and keeps both an in-memory copy of the repository data 64 and a disk copy of the repository data, each synchronized with those maintained by the primary manager. This implies that the secondary manager maintains its own persistent data store. The two repository managers 52 and 62 cooperate to (1) provide highly-available repository services, and (2) make sure that when the primary manager fails, the secondary manager will have consistent and up-to-date repository information to continue offering the cluster configuration repository services to its clients.

Repository managers 52 and 62 run on two nodes 50 and 60 (with access to local disks) of the cluster. Each of the remaining nodes 70 run a repository agent 72 that interfaces with the primary repository manager 52 to serve its local clients. Therefore, the cluster configuration repository clients, other than clients on nodes 50 and 60, never interact directly with the repository managers 52 and 62. They always contact the local repository agent 72 to get the cluster configuration repository services. Each repository agent 72 handles an in-memory software cache of priority repository data and can handle read requests by itself. However, to ensure proper serialization among concurrent updates, all repository data updates are managed by the primary repository manager 52 only. The repository agents 72, thereby, forward all write/update requests to the primary repository manager 52.

An important requirement of the cluster configuration repository service is to guarantee the consistency of the information kept by the two repository managers 52 and 62. This requirement remains even in the presence of undesirable events such as a failure of a repository manager 52 or 62, as well as failures in the data repositories 54 or 64. The cluster configuration repository design satisfies this requirement by enforcing "all or nothing" write semantics. The client sends the data to be written/updated to the primary manager 52 only. The primary manager 52 works with its secondary manager 62 counterpart and validates the successful completion of a write operation only when both primary manager 52 and secondary manager 62 have succeeded the operation. In case of failure of one manager, the other manager rolls back the effect of the operation and returns its repository to the state prior to the initiation of write operation.

The primary repository manager 52 and secondary repository manager 62 support the cluster configuration repository services in a highly available manner. There can be several ways of assigning these repository managers to the cluster nodes. The following approach is a preferred embodiment.

The carrier-grade high availability platform has various primary services 56 including the cluster configuration repository that must be available in the form of primary/secondary 56 and 66, e.g., the Component Instance/Role Manager (CRIM). It is desirable that the primary instances of these services 56 are co-located in the same node. It is also desirable that the secondary instances 66 are co-located on a node as well. The best possible location for the primary instances of these services 56 is the master or primary node 50 of the cluster. The carrier-grade high availability platform includes a cluster membership monitor to monitor removal and joining of nodes into clusters (due to failure, repair completion, or addition of a new node). The cluster membership monitor elects two nodes with special responsibilities: (1) Primary (Master) node 50, and (2) Secondary (Vice Master) node 60. It is preferred to assign the master node 50 to run the primary instances for all system services.

The secondary node 60 (which is an already-elected backup for the primary node 50) is also a preferred location to run the secondary instances of these services 66. When the primary instance of any of these services fails, this failure will be interpreted that the primary node 50 is incapable of hosting carrier-grade high availability system services, meaning that all primary instances of system services 56 should be failed over to the secondary node 60. In other words, after a failure in any of the system services 56, the cluster membership monitor will be notified to switch over the master role to the secondary node 60. Then, the cluster membership monitor will elect a new secondary master node and secondary instances of the system services will be recreated in the newly elected secondary master node.

The primary repository manager 52 runs in the master node 50 of the cluster, and the secondary repository manager 62 runs in the secondary node 60. In other words, the failure of the primary repository manager is translated to the failure of the master node and will be handled in that context. However, the cluster configuration repository should include mechanisms for handling various failures of its components.

When a cluster configuration repository service is started (for example during cluster initialization), it will start with an empty repository. The repository can then be populated through OAM&P (Operation, Administration, Maintenance and Provisioning). However, a second embodiment provides that some minimal repository information is included in the boot image where it can be used as the initial repository. The initial repository can, for example, include the information about the configuration of other essential carrier-grade high availability system services. The rest of the repository can be built later with the help of the clients themselves or OAM&P.

There are two possible upgrade styles during a software upgrade process: (i) a rolling upgrade, and (ii) a split-mode upgrade. During a rolling upgrade the services are being upgraded incrementally (one node at a time), thus, no specific protocol is needed to keep the cluster configuration repository service available to the whole cluster. However, during the split-mode upgrade the cluster is divided into two semi-clusters; one running the new release (new domain), and the other running the previous release (old domain). It is then inevitable to have two disjoint cluster configuration repository services, one for each domain. The cluster configuration repository supporting the new domain will initialize its repository using the same process as the cluster configuration repository initialization discussed earlier. This newly created cluster configuration repository will be initialized using the repository information in the boot-image or through OAM&P. It is important to notice that there are no automatic repository data exchanges between the two cluster configuration repositories. The new cluster configuration repository populates its data directly from the client or OAM&P, but not from the cluster configuration repository of the old domain. After the completion of the upgrade process, the cluster configuration repository representing the old domain dies out.

In a preferred embodiment, clients view the repository data as a set of tables. A table is represented as a regular file on a Unix-like file system. Each record (i.e., a row in the table) is accessed through a primary key. A hashing technique is used to map the given key into the location of the corresponding record. A table is represented in memory as a set of chunks. A chunk is a set of contiguous bytes and can be dynamically allocated/de-allocated to a table on an as needed basis.

If a table is opened in a node with the cached option, it will be cached in the address space of the local repository agent when the table is accessed for the first time. To further enhance the performance of read operations, the cluster configuration repository maps the cached table to the corresponding application address spaces using POSIX-like shared memory facility.

The cluster configuration repository is organized as a set of data tables, which can be accessed in a consistent manner from any node in the cluster. At creation time, it can be requested that a table be persistent. The table is then kept on redundant persistent storage devices. Tables are created with a given initial size that determines the number of pre-allocated records. This policy has been chosen to ensure that the minimal set of vital resources can be pre-allocated at creation time. Tables may grow dynamically after creation if the necessary resources (i.e. memory and storage space) are still available.

The name space of the tables is the global name space also used by event channels and checkpoints. Tables are referred to by their context and name, which are managed by the Naming Service through the naming API. The name server entry of a table created as persistent is also persistent.

Each table of the cluster configuration repository contains records of the same composition. A record is composed of a set of columns. Each column is represented by a unique name, which is a string. The value of a column may be of the following types: signed and unsigned number types (8, 16, 32 and 64 bit), string (fixed size array of ASCII characters), and fixed-length raw data. A string is null-terminated, therefore its length (the number of characters before the null character) is variable and may be less than the size of the array which is fixed and corresponds to the resources allocated for the string.

By construction, records in a given table all have the same fixed size. The API design assumes that the record size is between 4 bytes and 4 Kbytes, but does not exclude larger sizes. As records in a given table have the same composition, this composition is also called the record format or the table schema.

The cluster configuration repository identifies records using keys. One specific column of the record format is the record key. This particular column must be of type string, and its value is the unique identifier of a record within the table. The only way to search for a given record is by specifying its key. Each table is created with an associated hash index used to perform these lookups. The number of hash buckets (size of the index) can be specified at the time the table is created.

The repository allows an application to obtain a private copy of a record. The API supports the retrieval of any number of columns of a given record. This helps optimizing the access cost by avoiding the transfer of an entire (potentially large) record.

A record is created by writing a record with a key which does not exist in the table yet. Two local or concurrent write operations of the same record are serialized at some point (no interleaving occurs). When a record write operation successfully returns, the record has been committed to the redundant persistent storage. Subsequent reads of that record on any node return the updated data. If the write fails, the cluster configuration repository guarantees that the record has not been committed. If a read operation is issued concurrently with a write, it returns either the old values (before the modification) or the new values (after the modification), but not a mix of old and new values.

The repository also supports updates of any number of columns of a record. This means the whole record doesn't have to be rewritten just to update one column. In general, change to the repository incurs a notification to the applications in the form on an event.

A bulk update is an operation in which a large number of modifications are done to the repository. In order to optimize the cost of this operation, the process issues a bulk update start request, makes the individual modifications, then issues a bulk update end operation.

After the start primitive, the modifications are done using the usual primitives of the API. However, their effects may not be propagated throughout the cluster upon return from these primitives. This means that read operations on some other nodes may return the values as they were before the modifications. To simplify the management of concurrent modifications by other applications, only one process in the cluster can engage a bulk update at a time, and other processes will get an error code if they issue a bulk update start request.

When a process starts a bulk update, it specifies whether updates from other processes are still possible. If they are, individual writes can be interleaved within a bulk update without compromising the atomicity of any writes and reads. The only difference is that individual updates are immediately propagated throughout the cluster.

The end primitive completes the bulk update operations, previously started by the same process. It returns when all the modifications issued subsequent to the start point are propagated throughout the cluster. It also allows a new bulk update to be issued. If a process terminates for any reason (e.g., exit or crash) and it was in the middle of a bulk update operation, an implicit bulk update end operation is performed. The update operations already performed remain valid (no rollback).

In contrast to the non-bulk update operations, modifications made within a bulk update do not generate events, only one notification event is sent after the bulk update end is issued. If the bulk update end was made implicitly by the cluster configuration repository (i.e. the application process crashes), a special event is sent to tell applications that the bulk update is over and that it did not finish as planned.

Applications with critical time constraints require read access in a few hundreds of nanoseconds. A real-time API is provided to provide applications with faster mechanisms to retrieve data. It introduces new objects such as handles, column ids and links. It does not provide a real-time write operation.

An application accessing a table for the first time can request that the table be cached. If real-time access is required, the data needs to be present in memory on the local node, therefore the table must be cached. Using the real-time API on a non-cached table returns an error.

Caching a table has an impact on the memory consumption of both the local node and the main server. On the local node, the cache is populated on a per-request basis. Therefore, records that haven't been read once are not present on the local node and need to be fetched from the main server the first time they are accessed. On the main server, if the table is opened as cached, the full table is loaded into memory when the open call is performed. It is unloaded from memory when the table is closed. In other words, if the table is not cached, there is no in-memory representation of the table on the cluster and all operations must be performed on the persistent storage. It can be seen as a trade-off between performances and memory consumption.

If a table is opened by multiple processes, but only one wants it cached, caching has priority. In such a case, the table is loaded in memory of the main server and cached on the node where that application is running. Memory for the cache and on the main server is freed when the last application requesting caching closes the table.

Handles can be used by the application to memorize the result of a record lookup. Applications aware of the real-time API can then use handles to retrieve or update data once the cost of the initial lookup has been paid.

As a key is a string, columns of string type may contain keys to express persistent relations between records. Such columns are called links. Cross-table relations can be expressed using links, with the assumption that the related table names are known by the application and explicitly passed to the cluster configuration repository API.

The cluster configuration repository basic API uses the keys to express persistent references to other records. The real-time API of the cluster configuration repository internally associates a link to each one of these keys. The initial state of a link is "unresolved," a lookup operation is required to resolve the link by using its associated key. Once resolved, links allow the process to access data without performing a lookup, just as handles do. As opposed to handles, links are internal cluster configuration repository entities that cannot be accessed or copied into the process address space.

Accessing the repository through the real-time API is a two step process: 1) look up the repository using a key value to obtain a handle; and 2) use the handle to access the designated record.

The provided real-time API functions have the same semantics as the equivalent basic versions. They may return an ESTALE error condition when used with a handle corresponding to a deleted record. A real-time retrieve operation may return EWOULDBLOCK if the data to be read is not in memory on the local node yet.

In the basic API, the cluster configuration repository recognizes elementary, string and raw data types. The columns composing a record are considered as occupying a row in the table. Rows all have the same composition and are described by the data schema for a given table.

The following example illustrates what a schema definition looks like:

```
<cluster configuration repositoryTBL name="usertable"   key="channel">
<COL name="channel"    title="Channel Name"       type="char"       size="12"  />
<COL name="frequency"  title="Channel Frequency"  type="int32_t"               />
<COL name="category"   title="Category Name"      type="char"       size="10"  />
<COL name="flags"      title="Attributes"         type="uint16_t"              />
<COL name="encrypt"    title="Encryption key"     type="uint8_t"    size="12"  />
<COL name="sector"     title="Sector"             type="char"       size="14"  />
</cluster configuration repositoryTBL>
```

The declaration key="channel" indicates that the column named channel is the key of the record. The attribute title is optional and can be used to add a text description for the column. The attribute type is one of the supported data types, as described above. If the field is an array, its size is specified by the option attribute size (default value is 1).

The above XML definition corresponds to the following table structure:

| channel (12 char) | frequency (int32_t) | category (10 char) | flags (uint16_t) | encrypt (uint8_t) | sector (14 char) |
|---|---|---|---|---|---|

A schema is provided as ASCII text. A parser reads the text and decodes the composition.

Within the cluster configuration repository, data is organized in tables. The table identifier type used by the API is ccr_table_t. One entry of a given table is a record. All the records included in a table share the same type and size specified when the table is created.

Tables are referred to by their context and name within the global name space. An empty table can be created by using the ccr_table_create( ) primitive. ctx specifies the context where the table is to be created and table_name is the name of the table in that context. The client must have write permission for the context ctx. The schema parameter points to a buffer containing the schema text. The parameter specifies the number of pre-allocated records in the table and the number of hash buckets used to index the table. If the operation is successful, the table is created and desc is its identifier. The ccr_table_create( ) call is blocking.

The ccr_table_unlink( ) primitive deletes the table tabl_name in the context ctx. The client must have write permission for the context ctx. This operation will effectively remove the table data when the table is no longer open by any processes.

The ccr_table_open( ) primitive gives access to the table table_name in the context ctx. If the operation is successful, the table identifier is returned in desc. This identifier's scope is the process calling this primitive. This call is blocking.

The ccr_table_close( ) primitive removes the access to the table specified by desc. In other words, after this operation, subsequent operations using desc or its associated handles return an error.

The ccr_stat( ) primitive fills in the stat structure with information about the table specified by desc. The fields uid, gid are the credentials of the creator of the table, and mode is the protection mode specified during creation. flags is the current flag status of the table. Part of it is inherited from creation (O_PERSISTENT), part is dynamic (O_CACHED). rows is the number of records in the table. If the table is persistent and stored on disk, disk_size is the number of bytes occupied by the image of the table on the file system. If there is no image of the table on a file system, disk_size is set to 0. schema_size is the size in bytes of the XML text describing the schema of the table.

The ccr_get_XML( ) primitive returns in the buffer xml_buffer of size buffer_size the ASCII text describing the schema of the table specified by desc, as passed during the ccr_table_create( ) call. The buffer xml_buffer must be large enough to receive the full text. The ccr_stat( ) call can return the size of the XML schema description.

Records may be retrieved from the repository by using their key. Columns of a given record can be retrieved by specifying the key of the record and the names of the columns, in any order. The operation is non-blocking.

The ccr_record_kget( ) primitive finds in the table specified by desc the record whose key value matches the key parameter and if found, copies in the locations pointed by the column_values array the values of the columns specified by the column_names array. The column names in this array must be column names defined by the table schema, in any order. This primitive is blocking.

A "put" operation takes a number of columns of a single record and commits them to a given cluster configuration repository table. Atomicity is ensured on a per-record basis. First, a lookup is performed to find out if another record with the same key already exists. If such a record exists, it is overwritten. If it does not exist and specific arguments are given, a new record (new row) is created, and this may result in a memory (and storage space) allocation operation. In the new record, the columns not specified in the put operation are initialized to default values: integer types have a default value of 0, raw data filled with 0 and strings have 0 as first character (empty strings). A "put" operation is blocking and returns only when the write is committed to the repository. From the return of the call and on, read operations are guaranteed to return the updated values.

The ccr_record_kput( ) primitive commits new column values of a record to the cluster configuration repository. Atomicity is guaranteed on a per-record basis. The desc parameter specifies the table of data previously opened. By default, ccr_record_kput( ) is used to update existing records, but it can also be used to create a new record by passing a new key and setting the bit CCR_PUT_EXCREAT of the parameter put_flags.

Record destruction is performed by calling the ccr_record_delete( ) primitive. When ccr_record_delete( ) returns, the record specified by its key has been removed from the cluster configuration repository table. The ccr_record_delete( ) primitive removes the data record identified by key from the repository. Handles associated to the record become obsolete. A call to the ccr_record_delete( ) primitive is blocking.

The cluster configuration repository publishes events on event channels upon modifications to tables of the repository. Using the event API, an application can subscribe to an event channel to be notified of table changes. There is at most one event channel where the cluster configuration repository publishes notifications for a given table. An application can ask the cluster configuration repository what the channel for a particular table is, provided it has read permission on the table. An application can set the event channel used for the notifications on a table (it associates an even channel to a table). It needs to have read and write permissions on the table to do so.

Event channels are managed by the applications (creation, deletion, etc . . . ), therefore access permissions to the channel are up to the application which creates it. As event channels are global to the cluster, if an application sets the event channel for a table, other applications on other nodes can see it and subscribe to it (if they have the proper permissions). The same event channel can be used for the notifications of several tables.

The cluster configuration repository exports a default notification channel. This well-known channel allows to avoid an unnecessary channel declaration when notifications on a given table are not subject to any visibility restriction.

When an application removes the association between a table and a channel, an event of type CCR_NOTIFICATION_END is published to notify all the subscribers. It is up to the subscribers to stop listening, set a new channel for the table, or ask the cluster configuration repository if a new association has been made.

The ccr_channel_get( ) primitive returns in the buffer channel the full name of the event channel where the cluster configuration repository publishes notifications of table changes for the table called table_name in the context ctx. If there is no current association, an error is returned. Processes can then subscribe to the channel to start receiving notifications. The caller must have read permissions on the table. The maximum size of the channel name is the maximum size of a compound name as defined in the naming API.

The call is blocking.

Upon return from the ccr_channel_set( ) primitive, the cluster configuration repository publishes on the channel events related to the table table_name in the context ctx. The specified event channel must have been created before and the caller must have read and write permissions on the table. If an event channel is already associated to the table and channel is not CCR_NO_CHANNEL, an error is returned.

Failure of the event subsystem may prevent a notification of record change from being delivered to a subscribing application. In such cases, the application will eventually receive a notification that an event about a change to table X may have been lost. Then it is up to the application to check whether the records it is interested in in table X have changed.

The real-time API should only be used on nodes where the accessed tables are cached.

Data retrieval may be performed in 2 phases: 1) lookup phase and 2) actual read phase. During lookup phase, the application specifies the table descriptor and the key of the record it wants to access to obtain a handle on this record. A handle is therefore specific to a table descriptor. Also, it obtains a column identifier from the column name. A handle and a column ID defines a "cell" in the table. During the second phase, the application needs to use the RT API to obtain the content of the cell.

A column ID cannot become stale (unless the table is deleted and re-created), whereas a handle can become stale (when the record is deleted). For a handle to be valid, the table needs to be open. When the table is closed, all handles on that table become immediately stale.

The ccr_handle_get( ) primitive performs a lookup in the table specified by desc and returns a handle to the record specified by key. This call is blocking.

The ccr_handle_status( ) primitive checks the status of hdl. This call is non-blocking.

The ccr_cid_get( ) primitive provides column identifiers from column names in the table specified by desc.

The ccr_record_hget( ) primitive copies from the record specified by hdl the value of the columns specified by cid to the location specified by the column_value pointer array.

The ccr_record_hput( ) primitive writes at the columns specified by the cid array of the record specified by hdl with the values at the locations pointed by column_value. Though it uses handles and column identifiers, the ccr_record_hput( ) primitive is blocking and does not provide a real-time write operation.

Links are used to express references between records of possibly different tables. Links are a cluster configuration repository internal optimization which allows the repository to memorize the result of a lookup on one node.

The ccr_link_resolve( ) primitive performs a lookup to find in the table identified by destTable the record whose key value is the one in the record specified by srcHdl at the column specified by srcCid. The result of the lookup is stored in the administrative data of the cluster configuration repository and it will be used to avoid further lookups if ccr_link_resolve( ) is called again from any process on the same node. This call is blocking.

The ccr_bulkupdate_start( ) primitive indicates that the process will subsequently issue several modifications to the repository. The caller may prevent other processes from making any updates by setting the writer parameter accordingly. The modifications are done using the usual primitives as described above. However, their effects may not be propagated immediately throughout the cluster upon return from these primitives. This means that read operations on some nodes may return the values as they were before the modifications. During a bulk update, notifications are not sent by the update operations.

To simplify the management of concurrent modifications by other processes, only one process in the cluster can engage a bulk update at a time, and other processes will get an error code when calling this primitive.

The ccr_bulkupdate_end( ) primitive completes the bulk update operation, previously started by the same process by calling ccr_bulkupdate_start( ). It returns when all the modifications issues after the ccr_bulkupdate_start( ) are effective in the cluster, and a bulk update event is sent. It also allows a new bulk update to be issued. If a process terminates for any reason (exit or crash) and it was in the middle of a bulk update operation, an implicit bulk update end operation is performed.

The browsing API allows exploration of a table. Starting from the beginning of the table, it returns an array of keys of existing records. Then assuming the table schema is known, the record content can be read using the get primitives. Successive calls to a browsing primitive start at the location of the table where the previous call finished.

The ccr_table_list( ) primitive initializes the browser structure for browsing the table specified by desc. After initialization, browsing starts at the beginning of the table. The ccr_browse_next( ) primitive copies keys of existing records to the buffer specified by buffer, from the table and starting from a position implicitly defined by browser. It writes at most count keys in the buffer, or stops if the end of the table is reached. Keys are strings, therefore their length is variable, but all keys take the same space in the buffer, which is the maximum size for a key defined in the table schema. The return value is the actual number of keys written to the buffer. The browser structure is updated to the new browsing state.

The ccr-debug utility is a command-line tool to analyze a table representation in memory and on a disk (if applicable). It allows to detect and correct any anomalies in a table content. ccr_debug interacts with the cluster configuration repository to execute the command on the record designated by key of the table table_name.

It is be apparent to those skilled in the art that various modifications and variations can be made in the system for providing real-time cluster configuration data within a clustered computer network of the present invention without departing from the spirit or scope of the invention. Thus, it is intended that the present invention cover the modifications and variations of this invention provided they come within the scope of the appended claims and their equivalents.

What is claimed is:

1. A system for providing real-time cluster configuration data within a clustered computer network comprising a plurality of clusters, comprising:

a primary node in each cluster wherein said primary node includes a primary repository manager and a primary data repository, the primary repository storing a first set of cluster configuration data in the primary data repository;

a secondary node in each cluster wherein said secondary node includes a secondary repository manager and a secondary data repository, the secondary repository manager storing a second set of cluster configuration data in the secondary data repository; and at least one additional node in each cluster, wherein said additional node runs a repository agent, wherein said repository agent forwards all write/update requests to said primary repository manager, and wherein said additional node includes a client application using the repository agent as an interface to the primary repository manager when accessing the first set of cluster configuration data;

wherein said secondary repository manager cooperates with said primary repository manager to maintain the second set of cluster configuration data at said secondary node consistent with the first set of cluster configuration data maintained at said primary node;

wherein the write/update requests are sent only to said primary repository manager;

wherein the write/update requests are written by said primary repository manager and said secondary repository manager in said first and said second set of cluster configuration data, respectively; and wherein validating of completion of entry of said write/update requests is performed only when information is successfully written by both said primary repository manager and said secondary repository manager.

2. The system of claim 1, wherein said primary node further comprises primary services.

3. The system of claim 2, wherein said secondary node further comprises secondary services providing functionality of the primary services.

4. The system of claim 1, wherein said repository agent includes a software cache of repository data, wherein said repository data may be quickly accessed by the client application.

5. The system of claim 1, wherein said primary repository manager manages the storage of repository data comprising the first set of cluster configuration data on a first computer-readable medium, the maintenance of repository data on memory, and the synchronization of repository updates.

6. The system of claim 5 wherein said secondary repository manager manages the storage of repository data on a second computer-readable medium, and the maintenance of repository data on memory.

7. The system of claim 6 wherein the repository data in said secondary node is synchronously up-dated so as to remain consistent with the repository data of said first node.

8. The system of claim 6 wherein said first and second computer-readable mediums each include a disc.

9. The system of claim 1, wherein the client application registers an interest in a portion of the first set of cluster configuration data and the primary repository manager automatically notifies the client application of any changes in the portion of the first set of cluster configuration data.

10. A method of providing real-time cluster configuration data within a clustered computer network comprising a plurality of clusters, comprising the steps of;

choosing a primary node in each cluster wherein said primary node includes a primary repository manager;

choosing a secondary node in each cluster wherein said secondary node includes a secondary repository manager;

causing said secondary repository manager to cooperate with said primary repository manager to maintain information comprising secondary cluster configuration data at said secondary node consistent with information comprising primary cluster configuration data maintained at said primary node;

providing a repository agent for each additional node of each cluster, wherein the repository agent interfaces with the primary repository manager in its cluster to access the primary cluster configuration data;

sending write/update information from a client only to said primary repository manager;

causing said write/update information to be written by said primary repository manager and said secondary repository manager in said primary and secondary cluster configuration data, respectively; and validating completion of the entry of said write/update information only when the information successfully is written in both said primary repository manager and said secondary repository manager.

11. A computer program product comprising a computer useable medium having computer readable code embodied therein for providing real-time cluster configuration data within a clustered computer network comprising a plurality of clusters, the computer program product adapted when run on a computer to effect steps including:

choosing a primary node in each cluster wherein said primary node includes a primary repository manager;

choosing a secondary node in each cluster wherein said secondary node includes a secondary repository manager;

causing said secondary repository manager to cooperate with said primary repository manager to maintain information comprising secondary cluster configuration data at said secondary node consistent with information comprising primary cluster configuration data maintained at said primary node;

providing a repository agent for each additional node of each cluster, wherein the repository agent interfaces with the primary repository manager in its cluster to access the primary cluster configuration data;

sending write/update information from a client only to said primary repository manager;

causing said write/update information to be written by said primary repository manager and said secondary repository manager in said primary and secondary cluster configuration data, respectively; and validating completion of the entry of said write/update information only when the information successfully is written in both said primary repository manager and said secondary repository manager.

12. A computer program product comprising a computer useable medium having computer readable code embodied therein for providing real-time cluster configuration data within a clustered computer network comprising a plurality of clusters, the computer program product comprising:

means for choosing a primary node in each cluster wherein said primary node includes a primary repository manager;

means for choosing a secondary node in each cluster wherein said secondary node includes a secondary repository manager;

means for causing said secondary repository manager to cooperate with said primary repository manager to maintain information comprising secondary cluster configuration data at said secondary node consistent with information comprising primary cluster configuration data maintained at said primary node;

means for sending write/update information from a client only to said primary repository manager:

means for causing said write/update information to be written by said primary repository manager and said secondary repository manager in said primary and secondary cluster configuration data, respectively; and means for validating completion of entry of said write/update information only when the information successfully is written by both said primary repository manager and said secondary repository manager.

13. The computer program product of claim 12, further comprising:

means for providing a repository agent for each additional mode of each cluster, wherein the repository agent interfaces with the primary repository manager in its cluster.

* * * * *

UNITED STATES PATENT AND TRADEMARK OFFICE

CERTIFICATE OF CORRECTION

PATENT NO. : 7,010,617 B2

DATED : March 7, 2006

INVENTOR(S) : Mark A. Kampe et al.

It is certified that error appears in the above-identified patent and that said Letters Patent is hereby corrected as shown below:

Title page,

Item [73], Assignee, "Pala Alto, CA" should be -- Palo Alto, CA --.

Signed and Sealed this

Sixteenth Day of May, 2006

JON W. DUDAS

*Director of the United States Patent and Trademark Office*